United States Patent
Bellow

(10) Patent No.: US 6,227,623 B1
(45) Date of Patent: May 8, 2001

(54) WHEEL RIM PROTECTOR

(76) Inventor: Phillman J. Bellow, 2234 13th. St., Lake Charles, LA (US) 70601

(*) Notice: Subject to any disclaimer, the term of this patent is extended or adjusted under 35 U.S.C. 154(b) by 0 days.

(21) Appl. No.: 09/512,614

(22) Filed: Feb. 25, 2000

(51) Int. Cl.$^7$ ............................. B60B 7/00; B05C 11/11
(52) U.S. Cl. .................. 301/37.42; 301/37.1; 118/504
(58) Field of Search .................. 118/504, 505, 118/406, 301; 301/37.1, 37.22, 37.23, 37.42 I, 37.35, 37.36

(56) References Cited

U.S. PATENT DOCUMENTS

| | | | |
|---|---|---|---|
| Re. 20,750 | * 6/1938 | Hunt et al. | 301/37.1 |
| 4,784,440 | * 11/1988 | Fair | 301/37.1 |
| 4,787,331 | * 11/1988 | Jarvis | 118/504 |
| 4,792,191 | * 12/1988 | Farmer | 301/37.1 |
| 4,874,206 | * 10/1989 | Sampson | 301/37.36 |
| 5,423,599 | * 6/1995 | Sherod et al. | 301/37.1 |
| 5,435,630 | * 7/1995 | Tucker | 301/37.1 |
| 5,524,972 | * 6/1996 | Cailor et al. | 301/37.1 |
| 6,068,345 | * 5/2000 | Bressie | 301/37.1 |

* cited by examiner

*Primary Examiner*—S. Joseph Morano
*Assistant Examiner*—Jason R. Bellinger
(74) *Attorney, Agent, or Firm*—William B. Noll

(57) ABSTRACT

A protective shield for the wheel rim of an automobile, to be held against the wheel rim during the application of a protectant/cleanser to the side wall of a tire mounted on the wheel rim. The protective shield comprises a circular, generally flat body, preferably formed of plastic, of a size to overlie the wheel rim. The circular body includes a first annular, outwardly extending rib, a second continuous, outwardly extending rib spaced radially inwardly therefrom to define an annular channel, a continuous, yieldable foam-like member positioned within the channel, and a handle means. The foam-like member preferably extends above the respective ribs to provide a moisture sealing barrier between the body and wheel rim when held against the wheel rim.

4 Claims, 1 Drawing Sheet

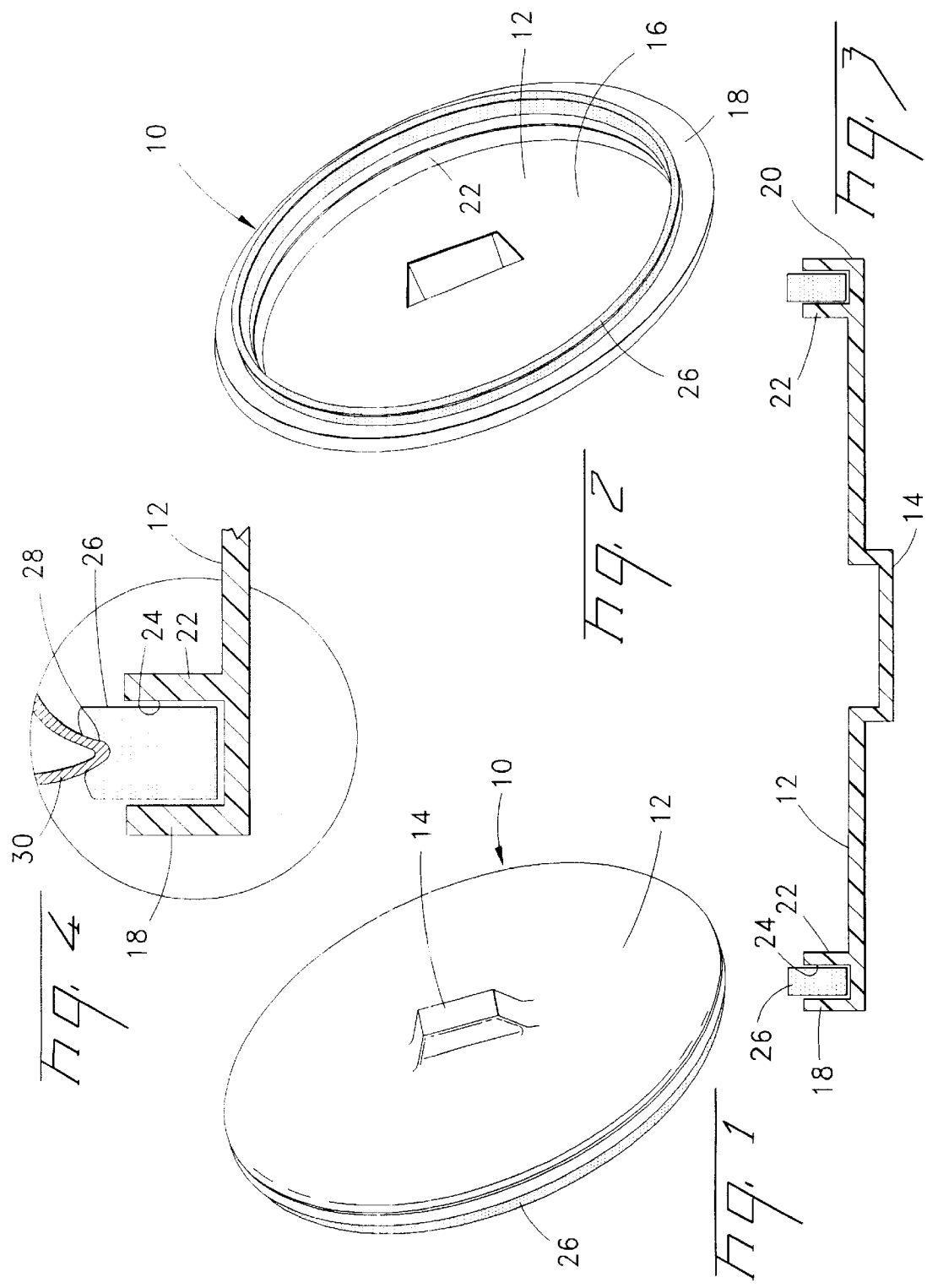

WHEEL RIM PROTECTOR

FIELD OF THE INVENTION

This invention is directed to the field of temporary protective shields to cover the wheel rim of an automobile to allow application of a protectant/cleaner to the tire, while protecting the wheel rim.

BACKGROUND OF THE INVENTION

The present invention relates to a temporary, protective cover to overlie the wheel rim of an automobile when applying a protectant/cleaner to the tire. There are commercial products on the market for spraying, for example, onto the tires to clean, shine and protect the tires. Since such products may contain chemicals to dissolve dirt and grime, there is a need to find a way to cover the wheel rim against inadvertent spraying thereon which could cause a dulling of the polished wheel rim.

The prior art offers some proposals for protecting areas of automobiles during painting or other applications. Such prior art is described in the following U.S. patents:

a.) U.S. Pat. No. 4,792,191, to Farmer, teaches an automobile wheel protector comprising a disk cut from thin sheet material such as cardstock or plastic. The disk includes a radial cut from the center to the periphery thereof. A plurality of short radial slits is cut in the periphery spaced apart from the radial cut, and a plurality of tabs for engaging any of the slits is cut in the periphery and spaced apart from the radial cut in the opposite circumferential direction. Engaging a tab with a slit forms a cone and the spacings therebetween are selected to form cone diameters to match automobile wheel diameters. Finger holes are provided around the apex of a formed cone to permit holding the cone over a wheel while cleaning a tire on the wheel.

b.) U.S. Pat. No. 4,787,331, to Jarvis, relates to a protective shield for use during spray painting of automobile panels. The shield covers an automobile wheel and tire during the spray painting of panels adjacent the wheel. The shield comprises a circular disk larger than the tire, a segment removed from the disk along the bottom and a flange extending axially inward along the perimeter of the disk ending at the segment. The segment and the flange combine to make the shield free standing. A hand hold is provided comprising a U-shaped cut formed in the center of the disk producing a hinged flap for grasping the shield for moving it about.

c.) U.S. Pat. No. 4,784,440, to Fair, discloses a wheel shield for covering the wheel of an automobile so that the sidewall of the tire carried thereon can be sprayed with a protectant solution. The shield comprises a frusto-conical body having a circumferential rim on the large diameter open end thereof and a knob on the small diameter closed end thereof. On the top of the cylindrical rim a retainer member is provided having an angularly inwardly and outwardly extending free end portion. On the body adjacent the cylindrical rim and opposite the free end portion a reinforcing box structure is provided. When the shield is placed over the outer flange of the wheel, a manual push applied on the front surface of the box structure forces the free end portion into the crevice formed between the rim portion of the wheel and the tire to thereby detachably hold the shield on the wheel.

While the foregoing prior art offer some solutions for protecting portions of an automotive body or tires when performing work on the automobile, none present an inexpensive and convenient manner to protect the wheel rim while applying a protectant/cleanser to the side wall of a tire mounted on said wheel rim. The manner by which this is achieved by the present invention will become clearer from the description which follows, particularly when read in conjunction with the accompanying drawings.

SUMMARY OF THE INVENTION

This invention relates to a protective shield for the wheel rim of an automobile, to be held against the wheel rim during the application of a protectant/cleanser to the side wall of a tire mounted on the wheel rim. The protective shield comprises a circular, generally flat body, preferably formed of plastic, of a size to overlie the wheel rim, where the generally flat body includes a first annular, outwardly extending rib, a second continuous, outwardly extending rib spaced radially inwardly therefrom to define an annular channel, and a continous, yieldable foam-like member positioned within the channel. The foam-like member preferably extends above the respective ribs to provide a moisture sealing barrier between the body and wheel rim. Further, the generally flat body may include a central hand gripping member to position, hold and remove the protective shield from the wheel rim.

Accordingly, an object of this invention is to provide a convenient, yet inexpensive protective shield to temporarily protect the wheel rim of an automobile when applying a protectant/cleanser to the tire side wall.

Another object hereof is the provision of a continuous, yieldable, foam-like member to ensure a moisture seal about the wheel rim while applying the protectant/cleanser to the tire side wall.

These and other objects will become more apparent, particularly to those skilled in the art, from a reading of the following description.

BRIEF DESCRIPTION OF DRAWINGS

FIGS. 1 and 2 are front and rear perspective views, respectively illustrating the protective shield for an automotive wheel rim according the present invention.

FIG. 3 is an enlarged, radial sectional view of the protective shield of FIGS. 1 and 2, showing the protective shield in a resiled or non-contact position.

FIG. 4 is an enlarged, partial radial sectional view showing the protective shield hereof in a compressed position relative to a wheel rim.

DETAILED DESCRIPTION OF PREFERRED EMBODIMENT

The present invention relates to a protective shield to be held against a wheel rim while applying a protectant/cleaner to the tire side wall mounted on the wheel rim. The protective shield provides a moisture seal between the side wall and the wheel rim. The protective shield will now be described with regard to the several Figures, where like reference numerals represent like components or features throughout the several views.

Turning now to the various Figures, the protective shield 10 comprises a circular, generally flat body 12, preferably formed of plastic, having a handle gripping member 14 centrally positioned thereon to allow the user to hold the protective shield 10 against the automotive wheel, as known in the art, while applying a protectant/cleanser to the tire side wall. Alternately, the body 12 may be frusto-conical in configuration.

The concave surface 16 of the protective shield 10 features a first, outwardly directed, continuous rib 18 along the periphery 20 of the generally flat body 12. A second rib 22, spaced uniformly and radially inwardly from said first rib 18, is also provided. By this arrangement an annular channel 24, as best seen in FIGS. 3 and 4, is formed.

Within the channel 24 a yieldable, continuous foam-like member 26 is provided. The height of the foam-like member 26 exceeds the height of the respective ribs 18, 22. FIG. 3 shows the relative arrangement of the foam-like member 26 to the ribs in a resiled or non-contact position. However, it will be noted, as best seen in FIG. 4, the upper portion 28 of the foam-like member 26 will be compressed into the channel 24 and over the channel defining ribs 18, 22, when the protective shield 10 is held against the wheel rim. This provides a moisture seal between the wheel rim 30 (see FIG. 4), and the tire side wall so as to protect the wheel rim from the protectant/cleanser being sprayed on the wheel rim. Further, the overlapping upper portion 28 provides a contact barrier between the wheel rim 30 and protective shield, whereby to prevent marring the surface of the wheel rim. That is, by virtue of the confining nature of the ribs 18, 22, the foam-like member 26 can only be compressed into the channel and over the respective ribs.

It will be understood that changes, modifications and variations may be made to the protective shield of this invention, particularly by those skilled in the art, upon a reading of the specification. Accordingly, no limitation is intended to be imposed thereon except as set forth in the accompanying claims

What is claimed is:

1. A protective shield for the wheel rim of an automobile, to be held against said wheel rim during the application of a protectant/cleanser to the side wall of a tire mounted on said wheel rim, said protective shield comprising:

a circular body of a size to overlie said wheel rim, said circular body including a first annular, outwardly extending rib, a second continuous, outwardly extending rib spaced radially inwardly therefrom to define an annular channel, and a continuous, yieldable foam-like member positioned within said channel, where said foam-like member extends above said respective ribs.

2. The protective shield according to claim 1, wherein said circular body includes a central hand gripping member to position, hold and remove said protective shield from said wheel rim.

3. The protective shield according to claim 1, wherein said circular body is generally planar.

4. The protective shield according to claim 1, wherein said circular body is fabricated of plastic.

\* \* \* \* \*